United States Patent

[11] 3,590,374

| [72] | Inventors | Brian Arthur Evans<br>Redhill, Surrey;<br>Ronald Ferguson Pearson, Reigate, Surrey;<br>Frederick William Harrison, Reigate,<br>Surrey, all of, England |
|------|-----------|-----|
| [21] | Appl. No. | 794,102 |
| [22] | Filed | Jan. 27, 1969 |
| [45] | Patented | June 29, 1971 |
| [73] | Assignee | U.S. Philips Corporation |
| [32] | Priority | Jan. 26, 1968 |
| [33] | | Great Britain |
| [31] | | 4232/68 |

[54] CURRENT MEASURING APPARATUS UTILIZING COMBINED ROTATIONAL EFFECTS OF TWO OR MORE FARADAY ELEMENTS
19 Claims, 5 Drawing Figs.

[52] U.S. Cl. .................................. 324/96, 324/127
[51] Int. Cl. ......................................... G01r 19/08
[50] Field of Search .................................. 324/96, 115, 127; 350/151

[56] References Cited
UNITED STATES PATENTS

| 2,169,071 | 8/1939 | Murray | 350/151 X |
| 2,981,888 | 4/1961 | White | 324/115 |
| 3,196,739 | 7/1965 | Wenking et al. | 350/151 X |
| 3,197,702 | 7/1965 | Schweitzer | 324/127 |
| 3,324,393 | 6/1967 | Casey et al. | 324/96 |
| 3,346,811 | 10/1967 | Perry et al. | 324/96 |
| 3,419,802 | 12/1968 | Pelenc et al. | 324/96 |

Primary Examiner—Gerard R. Strecker
Attorney—Frank R. Trifari

ABSTRACT: Apparatus for measuring the current in a high voltage line includes a magnetic core encircling the line. A coil is wound on the core to derive a current that is proportional to the line current. A pair of energizing coils each having a different number of turns are connected to the first coil. A pair of aligned magneto-optic Faraday elements are magnetically coupled to individual ones of the energizing coils. A beam of plane polarized infrared energy is directed through the Faraday elements to a detector. The detector indicates the total Faraday rotation produced by the Faraday elements on the infrared energy, which in turn is a function of the current in the line.

PATENTED JUN29 1971 3,590,374

INVENTORS
BRIAN A. EVANS
BY RONALD F. PEARSON
FREDERICK HARRISON

AGENT

CURRENT MEASURING APPARATUS UTILIZING COMBINED ROTATIONAL EFFECTS OF TWO OR MORE FARADAY ELEMENTS

This invention relates to apparatus for measuring the current flowing in an electric conductor and more particularly to apparatus for measuring monitoring or sensing electric alternating current by means of an element capable of rotating the plane of polarization of an electromagnetic beam as a quantitative function of the magnetic field in which the element is place. Such elements will hereinafter be referred to as Faraday elements. Conversion of an electric current to magnetic field energy can thus be used to modulate the plane of polarization of a light beam of any wavelength to which a particular element is transparent.

One such element is yttrium iron garnet (YIG) and its transparency to certain infrared wavelengths is known. The use of a YIG element for measuring currents is described in our Pat. application No. 4182/67 filed in Great Britain. There are certain materials which can be derived from YIG that are even more useful in certain cases. Further information on when to use and how to prepare such derivatives is set forth in our copending U.S. Pat. application Ser. No. 734,350, filed on June 4, 1968. Although other magneto-optic materials could be used with our invention, we prefer to use YIG materials and their derivatives because of the relatively high sensitivity of these materials to magnetic fields. The present invention is especially useful for monitoring the current flow in a high voltage transmission line. The problems arising due to the high voltages and high currents in these lines, as well as their relative inaccessibility, have not been adequately solved by known conventional measuring techniques.

Even if one uses a ground potential secondary coil magnetically coupled to the power line, insulation often becomes difficult if a reasonable degree of magnetic coupling is to be obtained. The above mentioned specification 4182/67 enables such a secondary to be used at line potential since the secondary influences a Faraday element, and the ground potential apparatus is only coupled to the Faraday element via a light beam, an insulating fiber optic path, or the like.

The objects of the invention are to enlarge the usefulness of Faraday elements for measuring currents in conductors that are inaccessible and/or hazardous to personnel, to give extra information, to minimize unnecessary responses or alarms, or to compensate for changing environmental factors that would otherwise prejudice the accuracy of the ammeter arrangement. Another object of the invention is to provide a system of high sensitivity that does not require very large single crystals of YIG, etc., nor the inordinate increase of magnetic field strengths acting on an element for a given current to be monitored.

Another object of the invention is to provide current measuring apparatus which avoids as far as possible fluctuations in response when a long power line is vibrating, e.g. in a high wind and which also avoids the requirement to move the element, thereby disturbing the optics, when the sensitivity is to be varied.

Another object of the invention is to provide apparatus by means of which the interfering magnetic effects of other nearby current conductors on the measurement of the wanted conductor can be reduced simply.

According to the invention, there is provided a magnetic core surrounding the conductor to be monitored, a plurality of energizing coils coupled to the conductor via a secondary coil wound on said core, a respective Faraday element positioned with respect to each of said energizing coils so as to be magnetically influenced thereby, and means for determining the effective total Faraday rotational effect produced by each element on the electromagnetic wave energy passing therethrough.

The rotation summing may be carried out electrically or optically, whichever is most convenient. A light beam may traverse the elements via a fiber optic connection, beam deflectors, reflectors, electrical transducing, rotation detection and retransducing, or the elements may be all aligned on a straight light beam path.

Temperature compensation may be provided. Also, an increase in sensitivity may be provided by concentration of the magnetic flux from the energizing coils through the Faraday elements.

Other features and advantages of the invention will become apparent from the following description taken in conjunction with the accompanying drawings, in which.

Figure 1:
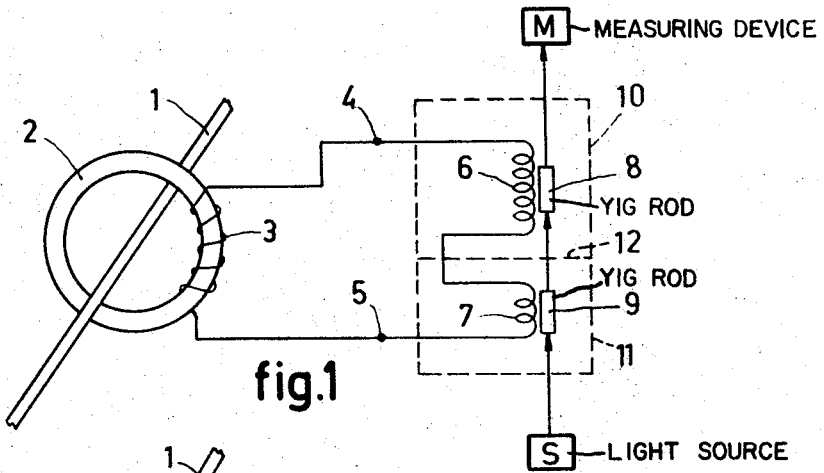
FIG. 1 shows a power line and Faraday effect current monitoring apparatus therefor partly in perspective form and partly in schematic form.
Figure 2:
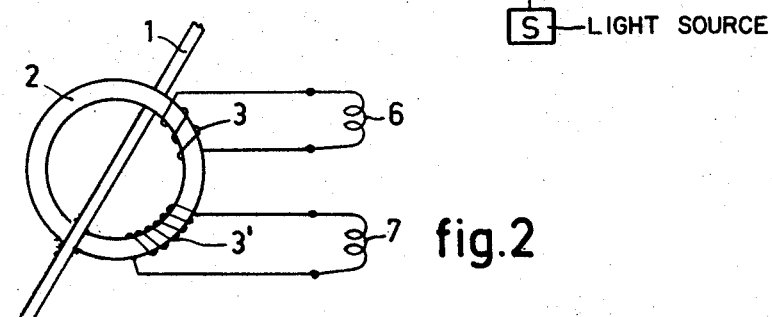
FIG. 2 shows a variation of the apparatus illustrated in FIG. 1.
Figure 3:
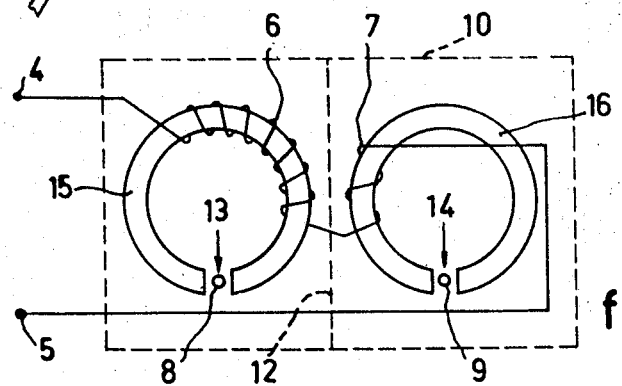
FIG. 3 shows a refinement of a part of the apparatus illustrated in FIG. 1.
Figure 4:
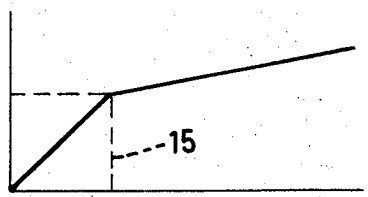
Figure 5:
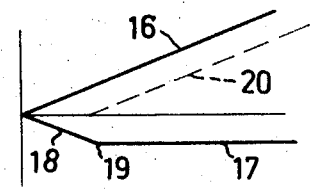

FIG. 4 shows a response graph for the above mentioned arrangements, plotted against current in the conductor, demonstrating the dual sensitivity character of the monitoring made possible by the invention; and FIG. 5 shows another response graph for the apparatus of FIGS. 1, 2 or 3, in which said apparatus is arranged to make no response until a certain threshold current has been reached, and thereafter providing a linear response upward of that threshold.

Referring to FIG. 1, there is shown a power line conductor 1 which is assumed to be carrying an AC current to be measured, possibly at a high voltage of several kilovolts, located in an inaccessible or exposed position, and carrying very high currents. The power line is surrounded at a monitoring point by a ring or toroidal magnetic core 2 on which is wound a secondary coil 3. The ends of this coil are connected to output terminals 4 and 5.

Thus, the voltage appearing at terminals 4 and 5 will be related to the current passing through the power line 1. Two coils 6 and 7 are connected in series across terminals 4 and 5. The former coil has many more turns then the latter. Rods 8 and 9 of YIG material are located in the magnetic fields of the coils 6 and 7, respectively. In practice, each rod will probably thread the coil, but they are shown outside the coils for simplicity of illustration. Each coil and its associated YIG rod is located in a separate magnetically screened Mu-metal enclosure 10, 11 which may of course have a common dividing wall 12.

The walls have holes to allow the entry of lead wires and also to allow the entry of the plane-polarized light beam (actually infrared light since YIG material is not transparent to visible light) from a light source S. The infrared beam travels through the YIG rods 9 and 8 in turn and then out to a measuring device M. The measuring device comprises means for determining the total amount by which the plane of polarization of the light from source S has been rotated en route through the two rods 8, 9.

It is assumed that the YIG rods are aligned so that the total rotation can be ascertained without determining the separate contributions of each of the rods. However, the rods may not be in line so that mirrors or fiber optic paths may have to be used to transport the beam, and either of these elements may cause further rotation of the plane of polarization. Thus, it may be necessary to measure the contributions separately in some instances, depending on the system geometry. Those skilled in the art will appreciate the fact that there are many other ways of measuring the total plane shift, which is all that is required for this embodiment.

We refer now to FIG. 2 which differs from FIG. 1 only in that coils 6 and 7, shown symbolically without the Faraday elements, are energized from separate secondary coils 3 and 3', which are electrically isolated. This means that not only can the coils 6 and 7 have different numbers of turns thereby to affect their associated rods 8 and 9 differently, but the differential effect may be enhanced by providing secondary coil 3' with many more turns than secondary coil 3.

The arrangements of FIGS. 1 and 2 show a current transformer feeding a pair of separate energizing coil magneto-optic Faraday element units. Another such arrangement, with the added advantage that the energizing coil fluxes are concentrated through the Faraday elements, is shown in FIG. 3. In this figure the energizing coils 6 and 7 are supplied in series, assumedly from a single transformer secondary coil 3 via a single pair of terminals 4 and 5, as in FIG. 1, but the dual feed system of FIG. 2 may be preferred sometimes.

Referring to FIG. 3, Faraday elements 8 and 9 can be seen end-on in airgaps 13 and 14, which are actually only just large enough to accommodate the elements in otherwise closed respective toroidal or ring shaped soft-magnetic cores 15 and 16, on which energizing coils 6 and 7 are wound. The free ends of the cores located near the Faraday elements may be tapered or shaped still further so as to match elements 8 and 9 flux concentration.

In the configuration shown, the cores 15 and 16 lie in the same plane in different Mu-metal screening enclosures. Some type of infrared reflecting agent (not shown) is provided which enables the measuring beam to pass through elements 8 and 9 in succession for subsequent detection of the total rotation of the plane of polarization. Alternatively, the elements could be aligned as in FIG. 1 so that an undeflected measuring beam could traverse both Faraday elements via an aperture in the dividing screening wall 12.

No matter how the optics is carried out, the layout of FIG. 3 provides a more efficient conversion of currents into Faraday rotations, but it must be emphasized that very large primary currents in conductor 1 may be involved so that it may not be necessary to increase the sensitivity by utilizing magnetic cores 15 and 16.

As will be explained subsequently, coils 6 and 7, cores 15 and 16 and secondary coils 3 and 3' in FIG. 2 may be equal or not, and may be arranged to produce adding or subtracting effects on the rotation of the polarization plane. Likewise, the elements 8 and 9 may or may not be of equal length, the light path may be arranged so that the rotations are added or subtracted.

The polarization measuring device M in FIG. 1 may comprise a fixed analyzer prism which attenuates a light beam according to its plane of polarization, and may perhaps include means to compare the analyzer output with a direct ray from source S in order to compensate for any fluctuations in source S. If fiber optic techniques are used, an analyzer and perhaps a photoelectric photometer may also be required, to be placed at a location immediately after the beam traverses the first Faraday element so as to intercept part of the beam, since fiber optic paths tend to lose or rotate the planes to polarization.

Further details concerning the evaluation of the rotation of the plane of polarization of a plane polarized light beam may be obtained from the description in our copending application Ser. No. 770,190, filed Oct. 24, 1968. That case deals with a system for reducing magnetic interference effects produced by nearby current carriers that adversely affect the accuracy of magneto-optic current measurements, which also is a subsidiary object of this invention.

One advantage provided by the novel arrangements shown in FIGS. 1, 2 and 3 will be explained with reference to FIG. 4 which graphically shows the total rotation of the plane of polarization response for two Faraday elements, in this graph assumedly added, as a function of the current to be measured in conductor 1, plotted along the abscissa.

It will be seen that the low current response, up to currents defined by a vertical dotted line 15, is very steep compared with the response at higher currents. This is achieved by providing a much stronger magnetic excitation per ampere for one Faraday element than for the other so that the one element saturates at the line 15 value of line current. Once the element saturates, it then contributes virtually nothing more to the response for higher currents. The other element, however, can continue to contribute a response for much higher currents, as is shown by the portion of the response curve to the right of line 15 on the graph.

By means of the apparatus described above, a multirange or multisensitivity capacity is provided, and without the need to switch ranges or to provide overload protection, shunts or cutouts. The saturation does no harm since it only immobilizes the one element until the current decreases below the value represented by line 15, whereat once again the one element's extra sensitivity will cause its contribution to the total response to predominate. High accuracy measurements up to 4000 amps can be achieved and it is estimated that up to 60,000 amps can be handled by means of this apparatus. It is clear that more than two energizing coils and elements, with or without separate secondary coils on core 2, can be used to add more ranges, each element saturating at a different level of the current to be measured.

If it is required to increase sensitivity without the premature saturation of an element, the light path therein can be lengthened by using a longer single crystal, or by reflecting the light (without altering its polarization) so that the beam traverses that element more than once, for example, as described in our aforementioned application 4182/67, FIGS. 3 and 4. Thus, the total Faraday response will depend on the effective length of the light path of the elements, their magnetic excitation per amp, and the level at which they saturate.

In FIG. 4 it is assumed that the polarization rotations all add, although this is not strictly necessary. A case where subtraction is advantageous is shown in FIG. 5. The subtraction effect may be derived electrically, magnetically or optically.

FIG. 5 shows a first approximately linear typical Faraday rotation response 16 of a first element, which does not saturate over the plotted current range, and a second response 18 of an oppositely excited or oppositely light-traversed second element, which is equally sensitive to low currents up to a limit 19 determined by the magnetic saturation. Above point 19, this element contributes nothing to the overall response, as shown by the horizontal portion 17 of the graph. The dashed line 20 of the graph shows the combined or total response of both elements, which shows that the sensitivity above the current value 19, where the second element saturates, is exactly the same as before for the first element. This arrangement responds linearly to currents above a predetermined threshold level. Currents below the threshold level might be prohibited currents, in which case a finite current flow can operate alarms or cutouts, or they may comprise a current range below which there is no interest. Thus, if the two elements are arranged to have equal sensitivity, but different saturation points, the above advantages can be achieved.

Another advantage obtainable by subtracting responses, but perhaps also by adding responses in some cases, is temperature compensation. Some Faraday elements may be strongly temperature dependent, as is disclosed in our pending British application 30115/67. This dependency may be a nuisance where temperature independence of the system is required and where it would be inconvenient to arrange constant temperature enclosures, as, for example, near a high voltage cable in a location exposed to all kinds of weather conditions. To compensate for temperature, two or more Faraday elements are used composed of materials having different temperature coefficients as described above, with different excitations, so that the temperature dependence of the combination can be held to a relatively low valve over a desired range. The difference in excitation may be achieved by different arrangements of the energizing coils or by using separate secondary coils (coils 3 and 3' in FIG. 2) each having a different number of turns.

In yet another embodiment of the invention, all of the energizing coils 6, 7, etc., and all of the Faraday elements 8, 9, etc., and also all of the secondary coils 3, if more than one is used, are similar. This provides a very simple means to give added sensitivity to the apparatus, which often cannot be augmented by simply using longer Faraday elements due to the difficulties involved in growing large single crystals, while multiple beam traversals of a single element may be impractical or too glossy for the often necessary oblique traversals. Furthermore, large Faraday blocks are susceptible to depolarization produced by domain structure. Thus, a plurality of similar thin slice Faraday elements can be used instead of one thick one, and each element can be identically driven, if only increased sensitivity is required, and not the other above described features realizable by this invention.

Although any magneto-optic material may be used for the Faraday elements, usually in monocrystalline form to prevent impermissible light scattering, the preferred materials are YIG and its derivatives by substitution. Most of these elements saturate at about 1500 Oersteds, but some derivatives may give a somewhat linear response above this value.

When the optical paths through the Faraday elements are separate, or are separately analyzed and perhaps photoelectrically detected, the maximum flexibility is obtained with regard to multiple sensitivities etc., but in many cases only the combined response, multiple-sloped or otherwise, is necessary to give all the required information, and with greatly simplified measuring equipment. The latter may be chosen according to specific requirements.

Another advantage of the invention is that it becomes relatively easy to provide an anti-interference magnetic screening enclosure for the apparatus, as described with reference to FIGS. 1 and 3. Coil 3 will be almost totally unaffected by external fields due to the use of a completely surrounding magnetic core, perhaps of ferrite, and thus there is avoided most of the interference problems that arise when a single Faraday element is directly energized by the magnetic field around the current conductor to be monitored.

Another disadvantage of a direct energization arrangement is that alternation of current ranges would probably be brought about by varying the distance of the Faraday element from the conductor, thus objectionably complicating the optics. The present invention, as described with particular reference to FIG. 4, solves the problem and avoids such complications. Similarly, in direct energization arrangements, vibration of a long line in high winds or the like produce undesired variations in the distance between the Faraday element and the energizing field of the line. However, the use of an encircling magnetic core, or a movement absorbing length of interconnecting leads to terminals 4 and 5, as described in the above embodiments, virtually eliminates fluctuations in response level due to vibration of the monitored line.

Thus, it can be seen that the embodiments disclosed provide, together or separately:

1. a Faraday effect device for measuring electric current comprising a search unit including a secondary winding on a magnetic core that encircles a conductor to be monitored, a plurality of magneto-optic Faraday elements, an energizing coil for each element, means connecting all of the energizing coils to the output of the search unit, and means for determining the Faraday actions of the elements on a measuring light beam, preferably the total action of all the elements.

2. A device as set forth in paragraph (1) wherein the energizing coils, and/or the Faraday elements, and/or the secondary windings (if in the plural), and/or the number of light traversals (if in the plural), are chosen so that additively or subtractively, temperature equalization, multirange sensitivity, or threshold current effects are obtained.

3. A device as set forth in paragraphs (1) and/or (2) wherein each energizing coil, along with its associated Faraday element, is provided with a separate magnetic screening enclosure.

Although the invention has been described with reference to the problems involved in monitoring high voltage power lines, it will be appreciated that the novel apparatus may be employed in numerous other systems. Furthermore, it will be readily apparent to those skilled in the art that various modifications may be made in the apparatus disclosed without departing from the spirit of the invention and falling within the scope of the appended claims.

We claim:

1. Apparatus for measuring the current flowing in an electric conductor comprising, a magnetic core encircling said conductor, coil means wound on said core, at least two magneto-optic Faraday elements, means for directing a beam of plane polarized electromagnetic energy through said Faraday elements, at least two energizing coils connected to the output of said coil means, each coil being magnetically coupled to an individual one of said Faraday elements to apply magnetic fields thereto each of which is proportional to the current in said conductor so as to produce rotation of the plane polarized energy passing through said Faraday elements as a function of the current in said conductor, and detection means responsive to the energy emerging from said Faraday elements for determining the total Faraday rotational effect produced by the algebraic addition of the rotational effects of each Faraday element on the electromagnetic energy passing therethrough.

2. Apparatus as described in claim 1 wherein the combination of a first one of said energizing coils and its associated magnetically coupled Faraday element are arranged so that said associated Faraday element will saturate at a lower level of conductor current than the Faraday element associated with the second energizing coil.

3. Apparatus as described in claim 1 wherein the number of turns of said two energizing coils are unequal so that the intensity of the magnetic fields applied to their respective Faraday elements are unequal for a given current in said conductor.

4. Apparatus as described in claim 1 wherein said coil means comprises at least two separate windings individually connected to respective ones of said energizing coils.

5. Apparatus as described in claim 4 wherein the number of turns of at least two of said separate windings are unequal.

6. Apparatus as described in claim 1 further comprising at least two other magnetic cores on which said energizing coils are individually wound, said other magnetic cores being arranged in the vicinity of their respective Faraday elements so as to he magnetic fields applied thereto by the respective energizing coils.

7. Apparatus as described in claim 6 wherein the number of turns of said two energizing coils are unequal thereby to magnetically saturate each of said Faraday elements at different levels of the conductor current.

8. Apparatus as described in claim 1 wherein said energizing coils are connected in series aiding relationship across the output of the coil means and said Faraday elements are arranged so that said polarized beam of electromagnetic energy passes serially through said elements.

9. Apparatus as described in claim 8 wherein said Faraday elements consist of rods composed of yttrium iron garnet material and said polarized beam consists of electromagnetic energy in the infrared region of the spectrum.

10. Apparatus as described in claim 1 wherein said energizing coils are connected in series opposition across the output of the coil means and said Faraday elements are arranged so that said polarized beam of electromagnetic energy passes serially through said elements.

11. Apparatus as described in claim 1 wherein the combination of a first one of said energizing coils and its associated magnetically coupled Faraday element and the combination of a second one of said energizing coils and its associated Faraday element are arranged to produce opposite rotational effects on the beam of polarized electromagnetic energy passing through said Faraday elements.

12. Apparatus as described in claim 11 wherein said first and second energizing coils are connected in series opposition across the output of the coil means and said Faraday elements are arranged so that said polarized beam of electromagnetic energy passes serially through said elements.

13. Apparatus as described in claim 11 wherein the number of turns of said first and second energizing coils are different so that one of said Faraday elements achieves magnetic saturation at a lower value of conductor current than the other Faraday element.

14. Apparatus as described in claim 1 further comprising separate magnetic shielding enclosures for each combination of an energizing coil and its associated Faraday element.

15. Apparatus for measuring the current in an electric conductor over a given current range comprising a magnetic core encircling said conductor, coil means wound on said core, at least two magneto-optic Faraday elements, means for directing a beam of plane polarized electromagnetic energy through said Faraday elements, at least two energizing coils connected to the output of said coil means in a manner such that each coil is subject to control by the same conductor current throughout the entire given current range, each coil being magnetically coupled with an individual one of said Faraday elements to apply magnetic fields thereto each of which is proportional to the conductor current thereby to produce rotation of the electromagnetic energy passing through said Faraday elements as a function of the current in said conductor, and detection means responsive to the energy emerging from said Faraday elements for determining the net resultant Faraday rotation of said energy beam produced by the algebraically combined rotational effects of each Faraday element on the electromagnetic energy passing therethrough.

16. Apparatus as described in claim 15 wherein said two Faraday elements and their associated energizing coils are arranged to produce different rotational effects on the energy beam per unit of conductor current, one of said elements being arranged to be more sensitive than the other element and also being arranged to saturate at a lower current level than the other element whereby said other element provides a higher current measuring range facility of lower sensitivity.

17. Apparatus as described in claim 15 wherein said two Faraday elements and their associated energizing coils are arranged to produce equal and opposite rotational effects on the energy beam per unit of conductor current up to a given current level at which one of said Faraday elements is arranged to saturate.

18. Apparatus as described in claim 15 wherein said two Faraday elements are composed of materials having different temperature coefficients said coil means and said energizing coils being arranged to energize said two Faraday elements at different levels of magnetic energization for a given conductor current so that the resultant temperature coefficient of the combined Faraday elements is lower than that for either element alone.

19. Apparatus as described in claim 15 further comprising means connecting said energizing coils in series in a manner such that the same current flows in each throughout the entire given current range.